United States Patent
Yoshitake (12)

(10) Patent No.: US 6,169,156 B1
(45) Date of Patent: *Jan. 2, 2001

(54) BRANCHED SILOXANE-SILALKYLENE COPOLYMER

(75) Inventor: Makoto Yoshitake, Chiba Prefecture (JP)

(73) Assignee: Dow Corning Toray Silicone Co., Ltd., Tokyo (JP)

( * ) Notice: Under 35 U.S.C. 154(b), the term of this patent shall be extended for 0 days.

This patent is subject to a terminal disclaimer.

(21) Appl. No.: 09/140,303

(22) Filed: Aug. 26, 1998

(51) Int. Cl.[7] .................................... C08G 77/12
(52) U.S. Cl. ................ 528/31; 528/35; 556/434
(58) Field of Search .............. 556/434; 528/31, 528/35

(56) References Cited

U.S. PATENT DOCUMENTS

| 4,707,531 | 11/1987 | Shirahata | 528/12 |
| 5,929,187 | * 7/1999 | Yoshitake | 528/15 |

FOREIGN PATENT DOCUMENTS 107671   8/1994   (JP) .

* cited by examiner

*Primary Examiner*—Margaret G. Moore
(74) *Attorney, Agent, or Firm*—Melvin D. Fletcher

(57) ABSTRACT

A novel branched siloxane-silalkylene copolymer containing a plurality of silicon-bonded hydrogen atoms or silicon-bonded alkoxy groups in the molecule. The copolymers are used to improve properties, such as, mechanical strength, adhesiveness, and durability of the an product.

4 Claims, 5 Drawing Sheets

BRANCHED SILOXANE-SILALKYLENE COPOLYMER

BACKGROUND OF INVENTION

The invention is a novel branched siloxane-silalkylene copolymer containing a plurality of silicon-bonded hydrogen atoms or silicon-bonded alkoxy groups in the molecule. The copolymers are used to improve properties, such as, mechanical strength, adhesiveness, and durability of an end product.

Organosilicon polymers containing a plurality of silicon-bonded hydrogen atoms in the molecule are used as crosslinkers in hydrosilylation-based crosslinking reactions and as precursors in the synthesis of functional organosilicon polymers. Recently a desire has arisen in this area for the development of novel crosslinkers that would have higher crosslinking efficiencies and would result in the production of cured articles with excellent mechanical strength, adhesiveness, and durability properties. The result has been the appearance of a variety of organosilicon polymers that contain a plurality of silicon-bonded hydrogen atoms in each molecule (refer to Japanese Patent Application Laid Open (Kokai or Unexamined) Numbers Sho 61-195129 (195,129/1986) and Hei 6-107671 (107,671/1994)). However, even these organosilicon polymers do not provide entirely satisfactory results when used as crosslinkers or precursors.

Organosilicon polymers containing a plurality of silicon-bonded alkoxy groups in the molecule are known to be useful as raw materials for coatings, paints and as crosslinkers for moisture-curing compositions. In the last few years the need has also arisen in this area for the development of highly reactive organosilicon polymers that could be used to improve various properties such as the mechanical strength, adhesiveness, and durability of the end product.

Japanese Patent Application Laid Open (Kokai or Unexamined) Number Hei 7-17981 (17,981/1995) teaches a dendritic organosilicon polymer. The addition reaction between tetravinylsilane and organochlorosilane is disclosed for its synthesis, but the subject organosilicon polymer has little industrial utility because the precursor tetravinylsilane is a unique and highly specialized compound. In addition, while this organosilicon polymer contains silicon-bonded hydrogen, alkoxy cannot be inserted in the subject polymer by the above-described preparative method.

The present invention provides a novel branched siloxane-silalkylene copolymer that contains a plurality of silicon-bonded hydrogen atoms or silicon-bonded alkoxy groups in the molecule used to improve properties, such as, mechanical strength, adhesiveness, and durability of an end product.

SUMMARY OF INVENTION

The present invention relates to the branched siloxane-silalkylene copolymer represented by formula

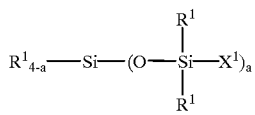

which $R^1$ is $C_1$ to $C_{10}$ alkyl or aryl, a is 3 or 4, and $X^1$ is the silylalkyl group represented by formula at i=1

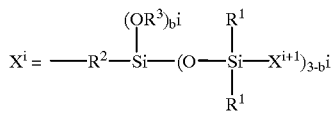

where $R^1$ is as previously defined, $R^2$ is $C_2$ to $C_{10}$ alkylene, $R^3$ is $C_1$ to $C_{10}$ alkyl, $X^{i+1}$ is a hydrogen atom or silylalkyl group, i is an integer with a value from 1 to 10 that specifies the generation of the silylalkyl group, and $b^1$ is an integer from 0 to 3.

DESCRIPTION OF INVENTION

Figure 1:
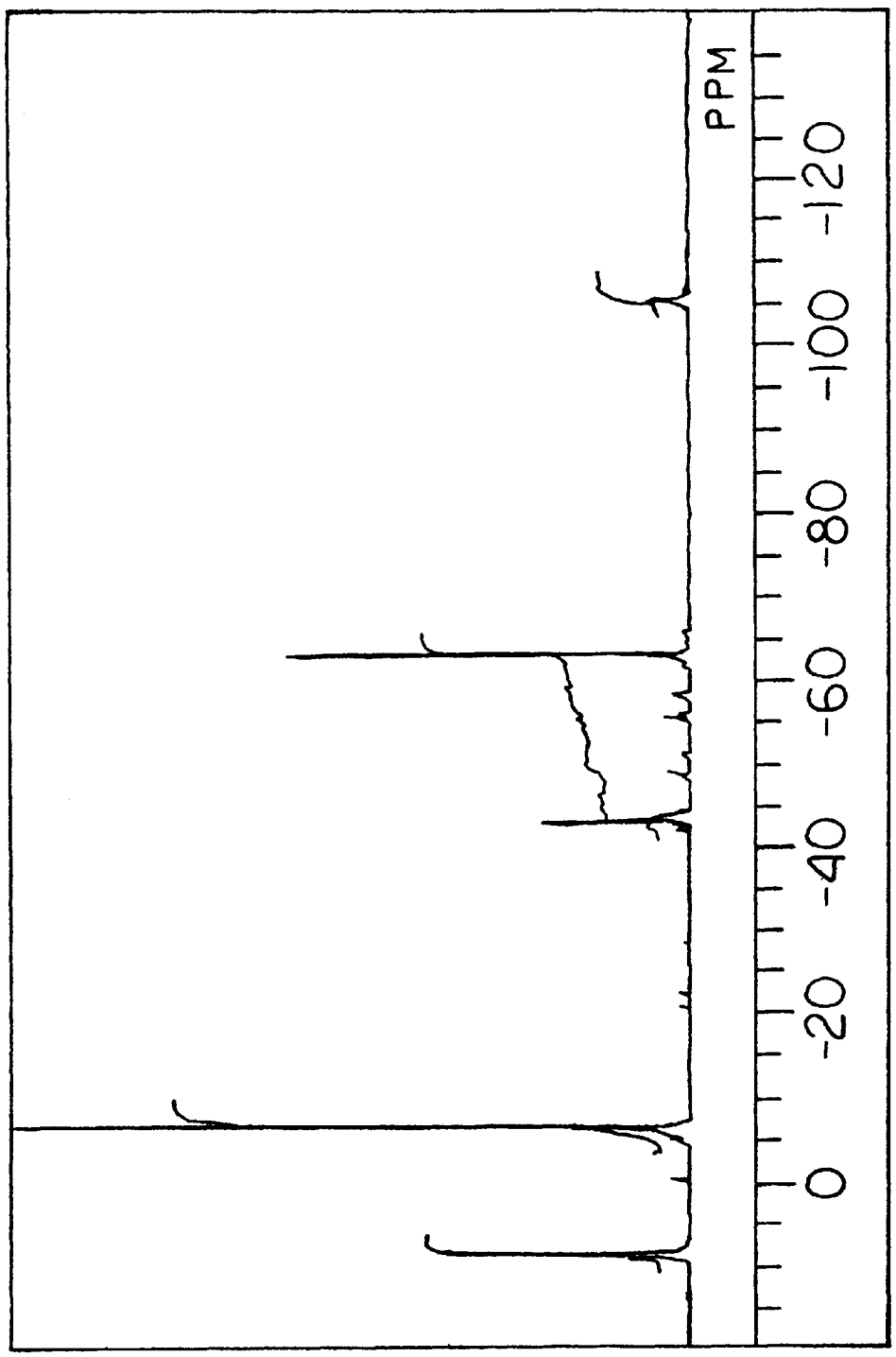
FIG. 1 contains the $^{29}$Si-nuclear magnetic resonance spectrum for the branched siloxane-silalkylene copolymer prepared in Example 1.
Figure 2:
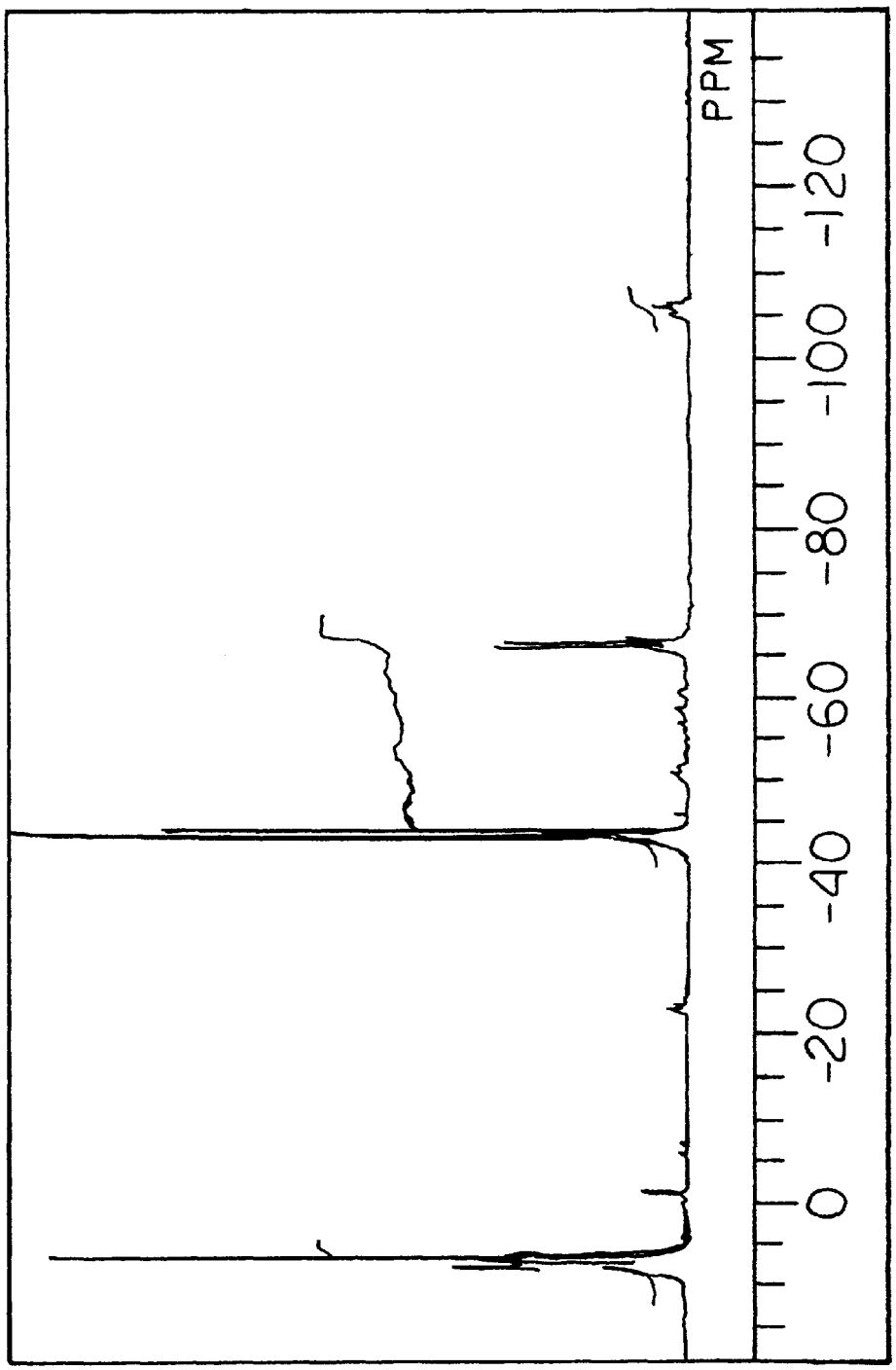
FIG. 2 contains the $^{29}$Si-nuclear magnetic resonance spectrum for the branched siloxane-silalkylene copolymer prepared in Example 2.
Figure 3:
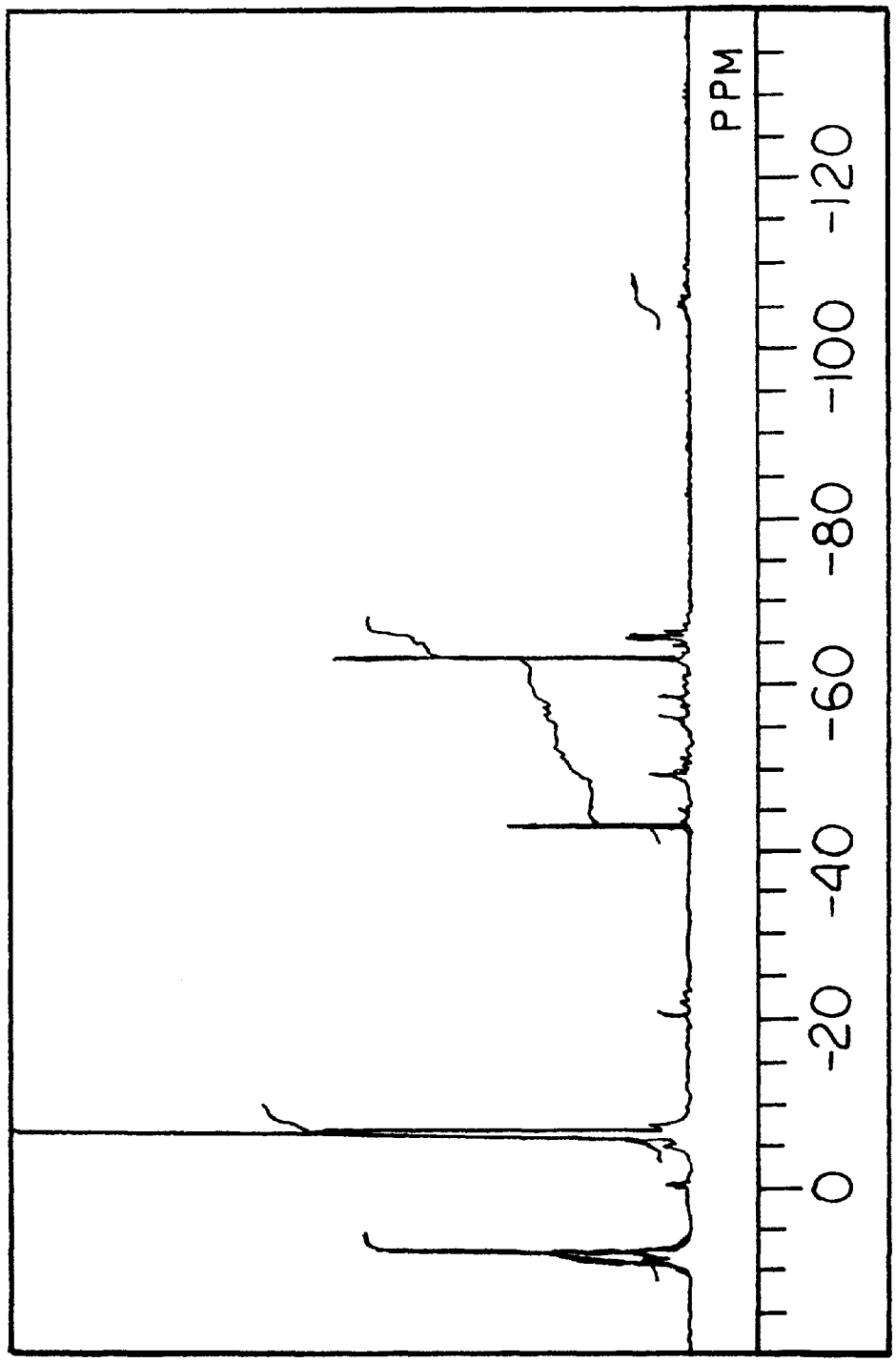
FIG. 3 contains the $^{29}$Si-nuclear magnetic resonance spectrum for the branched siloxane-silalkylene copolymer prepared in Example 3.
Figure 4:
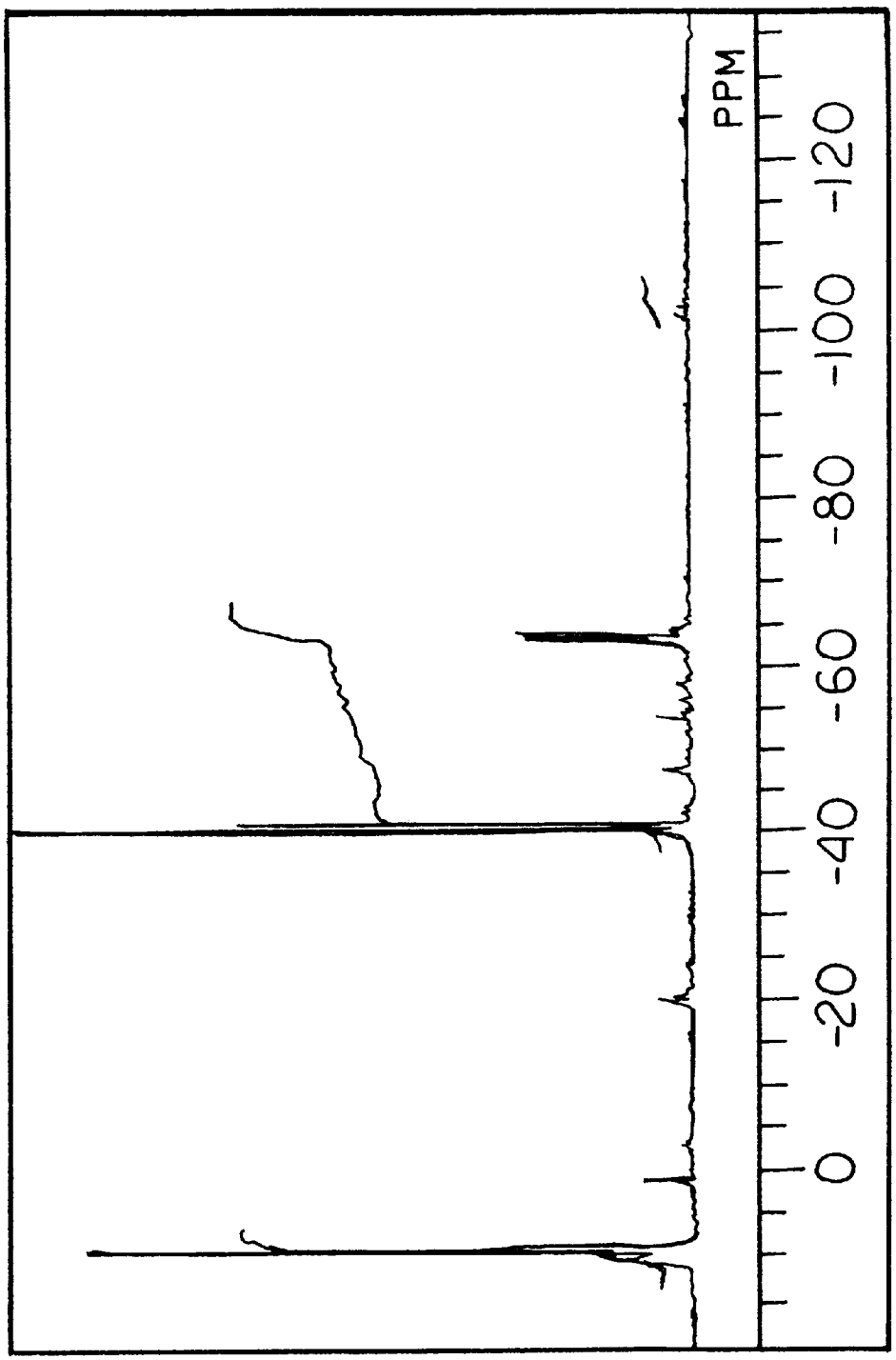
FIG. 4 contains the $^{29}$Si-nuclear magnetic resonance spectrum for the branched siloxane-silalkylene copolymer prepared in Example 4.
Figure 5:
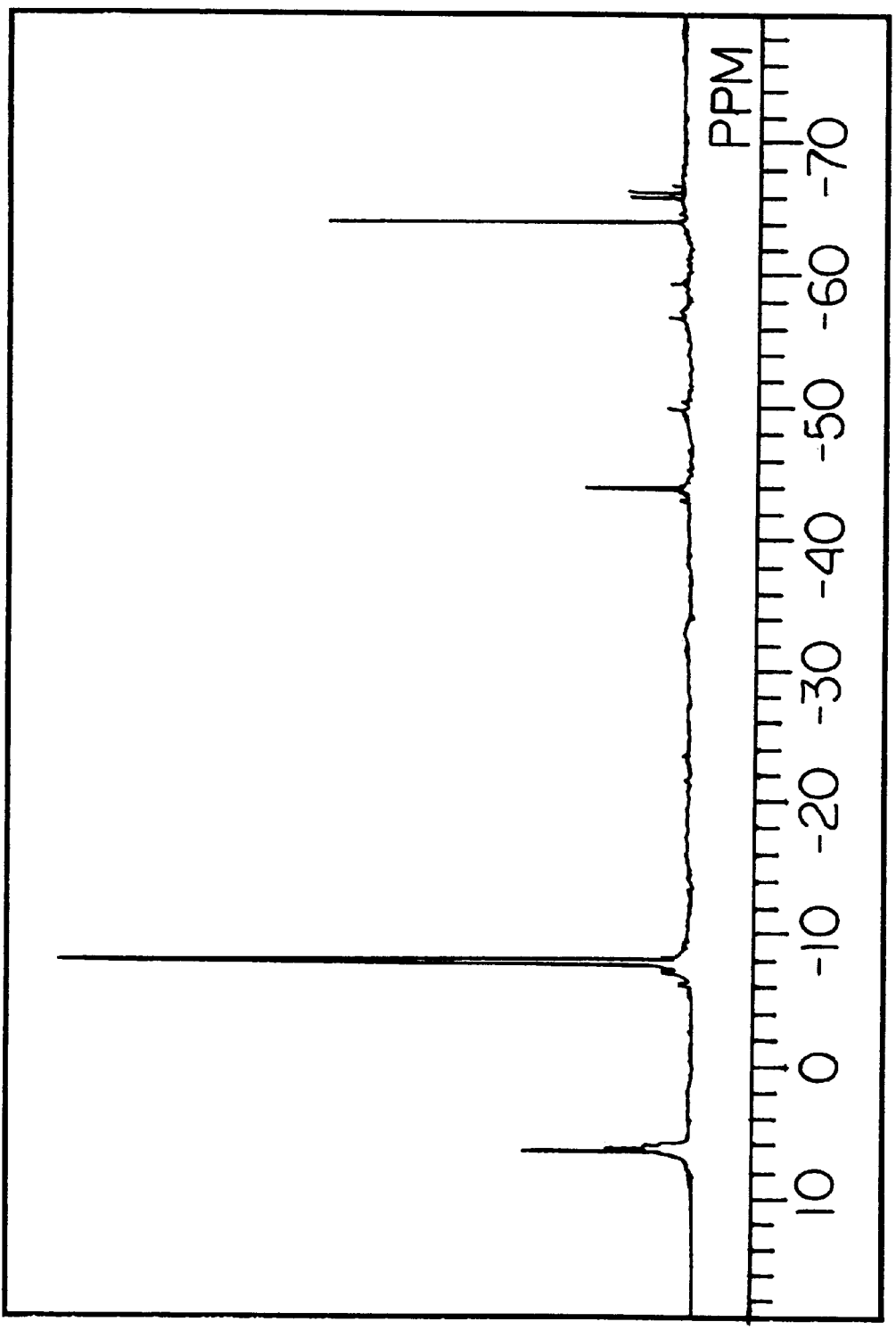
FIG. 5 contains the $^{29}$Si-nuclear magnetic resonance spectrum for the branched siloxane-silalkylene copolymer prepared in Example 5.

The branched siloxane-silalkylene copolymer according to the present invention is represented by formula

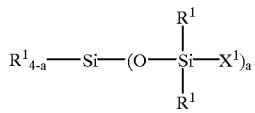

where $R^1$ is selected from the group consisting of $C_1$ to $C_{10}$ alkyl or aryl; with the alkyl being exemplified by methyl, ethyl, propyl, butyl, pentyl, isopropyl, isobutyl, cyclopentyl, and cyclohexyl and the aryl being exemplified by phenyl and naphthyl. Methyl is preferred for $R^1$. The subscript a has a value of 3 or 4. $X^1$ is the silylalkyl group represented by formula

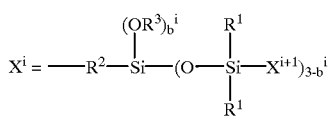

at i = 1, where $R^2$ is selected from the group consisting $C_2$ to $C_{10}$ alkylene and is exemplified by straight-chain alkylene such as ethylene, propylene, butylene, and hexylene and by branched alkylene such as methylmethylene, methylethylene, 1-methylpentylene, and 1,4-dimethylbutylene. Ethylene, methylmethylene, hexylene, 1-methylpentylene, and 1,4-dimethylbutylene are preferred for $R^2$. $R^3$ is selected from the group consisting of $C_1$ to $C_{10}$ alkyl and is exemplified by methyl, ethyl, propyl, butyl, pentyl, and isopropyl with methyl and ethyl being preferred. $R^1$ is defined as above. $X^{i+1}$ is the hydrogen atom or the aforesaid silylalkyl group, but the $X^{i+1}$ positioned at the molecular chain terminals is hydrogen. The superscript i, which is an integer from 1 to 10, indicates the generation number of the silylalkyl group under discussion, i.e., the number of repetitions of this silylalkyl group. Thus, the branched siloxane-silalkylene copolymer according to the present invention will have the following formula at a generation number of 1:

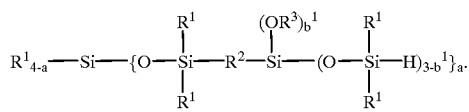

The branched siloxane-silalkylene copolymer according to the present invention will have the following general generation number of 2

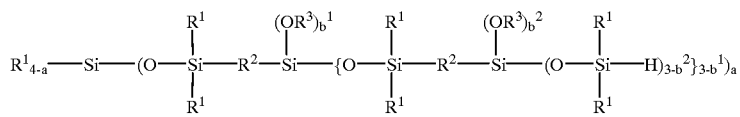

in which the sum of $b^1$ in the individual molecule is less than $(3 \times a)$, and will have the formula at a generation number of 3

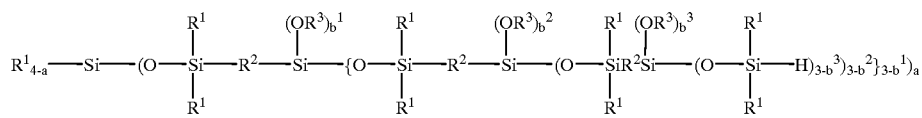

where the sum of $b^1$ in the individual molecule is less than $(3 \times a)$ and the sum of $b^2$ in the individual molecule is less than $\{3 \times a \times (3-b^1)\}$. In addition, $b^i$ is an integer from 0 to 3.

The branched siloxane-silalkylene copolymer according to the present invention as described above is obtained as the individual compounds or as mixtures thereof and can be specifically exemplified by the following average molecular formulas:

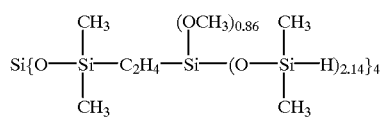

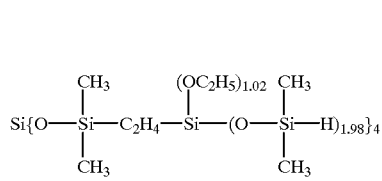

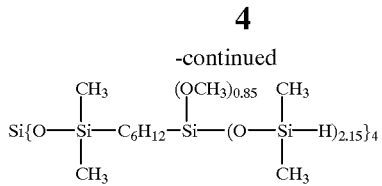

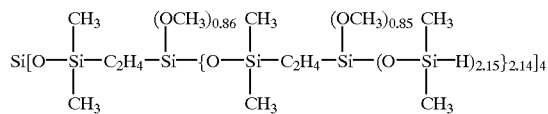

-continued

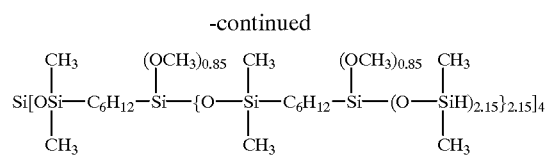

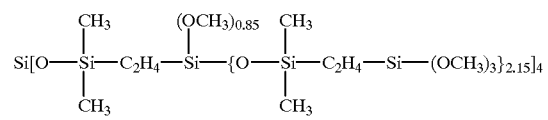

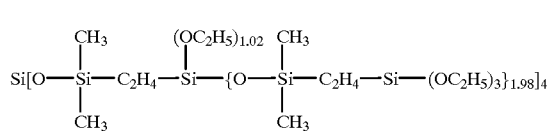

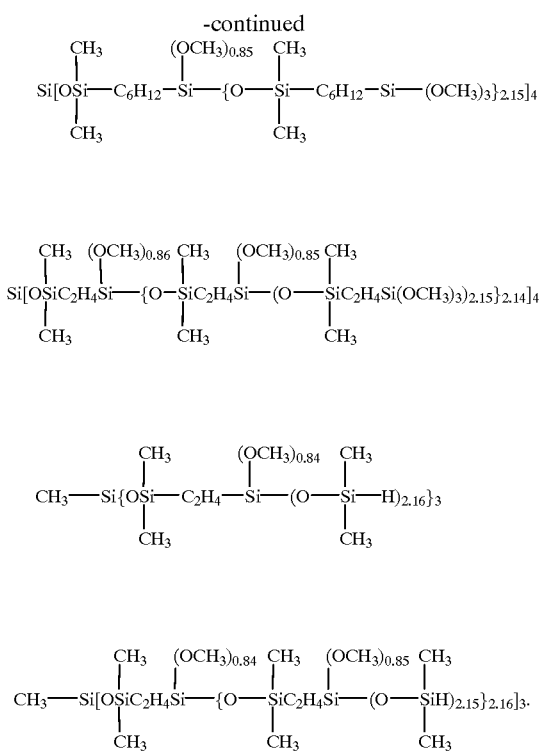

The present branched siloxane-silalkylene copolymers according to the present invention can be prepared, for example, by executing the following processes (x) and (y) in alternation and at least once.

In process (x), siloxane having the formula

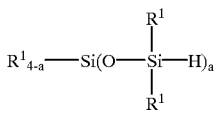

where $R^1$ and a are as previously defined or the branched siloxane-silalkylene copolymer afforded by the following process (y) is addition-reacted with an alkenyl-functional alkoxysilane having the formula

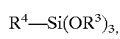

where $R^3$ is defined as above and $R^4$ is a $C_2$ to $C_{10}$ alkenyl, in the presence of a platinum catalyst to yield the alkoxy-endblocked branched siloxane-silalkylene copolymer.

In process (y), the branched siloxane-silalkylene copolymer afforded by process (x) is reacted with disiloxane having the formula

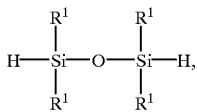

where $R^1$ is as defined previously, in the presence of an acidic aqueous solution to yield SiH-functional branched siloxane-silalkylene copolymer.

An alkoxy-endblocked branched siloxane-silalkylene copolymer is obtained when the last step in the aforementioned preparative method is the process (x). Silicon-bonded hydrogen-endblocked branched siloxane-silalkylene copolymer is obtained when the last step is the process (y).

The platinum catalyst used in process (x) is exemplified by chloroplatinic acid, alcohol-modified chloroplatinic acid, platinum-olefin complexes, and platinum-diketonate complexes. The platinum catalyzed addition reaction under consideration is preferably run using a slight excess of the alkenyl-functional alkoxysilane over the SiH-functional silicon compound in order to effect complete reaction of the silicon-bonded hydrogen in the starting material. The excess alkenyl-functional alkoxysilane can be separated and recovered after the reaction by distillation under reduced pressure. This addition reaction can be run at ambient or elevated temperature and can also be run using a solvent that does not interfere with the reaction.

The reaction in process (y) is preferably run by the dropwise addition of the branched siloxane-silalkylene copolymer afforded by process (x) to a mixture of the above-described disiloxane and an acidic aqueous solution. Preferably at least 1 mole of the disiloxane is used in this reaction per mole alkoxy group in the copolymer. The reaction temperature is preferably no greater than 50° C. The reaction runs very efficiently when it is run in the presence of a hydrophilic solvent such as methanol, ethanol, or isopropanol. After the reaction, separation and isolation of the organic layer and its ensuing distillation under reduced pressure yields the high-purity branched siloxane-silalkylene copolymer as the residue.

In a specific example, the reaction of a tetrakis (dimethylsiloxy)silane starting reagent having formula

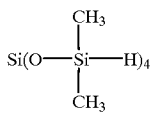

with vinyltrimethoxysilane in the presence of a platinum catalyst gives a reaction product having formula

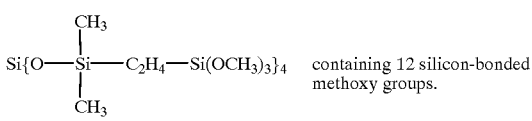

containing 12 silicon-bonded methoxy groups.

The reaction of this product by dropwise addition to a mixture of 1,1,3,3-tetramethyldisiloxane and aqueous hydrochloric acid gives branched siloxane-silalkylene copolymer having average formula

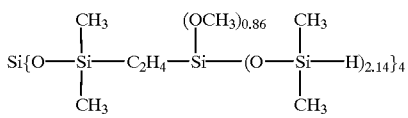

that has an average of 8.6 silicon-bonded hydrogen atoms in each molecule and an average of 3.4 silicon-bonded methoxy groups in each molecule. The further reaction of this branched siloxane-silalkylene copolymer with vinyltrimethoxysilane in the presence of a platinum catalyst yields branched siloxane-silalkylene copolymers having average formula

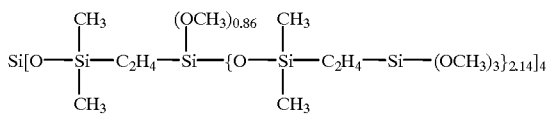

that contain an average of 29 silicon-bonded methoxy groups in each molecule. The further reaction of these branched siloxane-silalkylene copolymers by dropwise addition to a mixture of 1,1,3,3-tetramethyldisiloxane and aqueous hydrochloric acid gives branched siloxane-silalkylene copolymers having average formula

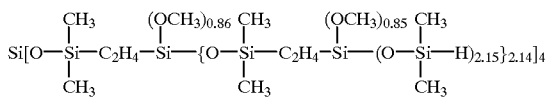

that contain an average of 17.9 silicon-bonded hydrogens in each molecule and an average of 11.1 silicon-bonded methoxy groups in each molecule. Finally, the further reaction of these siloxane-silalkylene copolymers with vinyltrimethoxysilane in the presence of a platinum catalyst yields branched siloxane-silalkylene copolymers having average formula

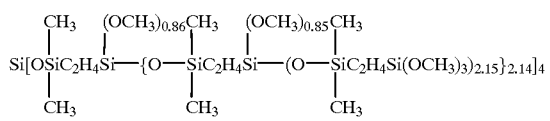

that contain an average of 65 silicon-bonded methoxy groups in each molecule.

The silicon-bonded hydrogen is subject to alcoholysis in process (y) with the result that a small amount of the following monoalkoxysiloxy group may also be present as X, where

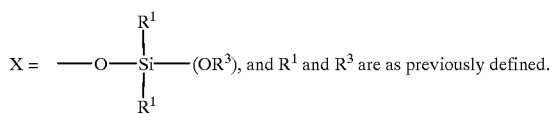

$X = \text{—O—Si(R}^1)(R^1)\text{—(OR}^3)$, and $R^1$ and $R^3$ are as previously defined.

A characteristic feature of the present branched siloxane-silalkylene copolymers as described above is that each molecule contains a plurality of silicon-bonded hydrogen atoms or silicon-bonded alkoxy groups. When this copolymer contains silicon-bonded hydrogen, it is useful in particular as a crosslinker for hydrosilylation-curing compositions and as a precursor for the synthesis of functional organosilicon polymers. When the subject copolymer contains silicon-bonded alkoxy, it offers the advantage of a high reactivity, which makes it useful as a starting material for coatings paints and as crosslinkers for moisture-curing compositions.

The invention will be explained in greater detail below through working examples. In the examples, the branched siloxane-silalkylene copolymer of the present invention was identified through analysis by $^{29}$Si-nuclear magnetic resonance and gel permeation chromatography. Toluene was used as a solvent.

Example 1

Vinyltrimethoxysilane (103.6 g) and isopropanolic chloroplatinic acid solution (0.04 g 3%) were placed in a 200-mL four-neck flask equipped with a stirrer, thermometer, reflux condenser, and addition funnel and were heated at 100° C. while stirring. To this mixture was gradually added dropwise tetrakis(dimethylsiloxy)silane (49.4 g ) from the addition funnel in such a manner that the reaction temperature was kept at 100 to 110° C. After the completion of addition, the reaction solution was heated at 120° C. for an additional 1 hour. After cooling the reaction solution was transferred to a round bottom recovery flask and concentrated on a rotary evaporator under reduced pressure to give 138.4 g of a very light brown liquid. Next, 1,1,3,3-tetramethyldisiloxane (141.0 g), 100 mL concentrated hydrochloric acid, 200 mL water, and 200 mL isopropanol were placed in a 1-L four-neck flask equipped with a stirrer, thermometer, reflux condenser, and addition funnel and were stirred. To this mixture was gradually added dropwise 80.6 g of the very light brown liquid referenced above from the addition funnel over 1 hour. After the completion of addition the reaction solution was stirred for an additional 1 hour at room temperature. It was then transferred to a separatory funnel, where the lower layer was separated off. The remaining liquid upper layer was washed twice with 200 mL water and once with 50 mL saturated aqueous sodium bicarbonate and was subsequently dried over anhydrous magnesium sulfate. The produced solid was filtered off and the resulting solution was transferred to a round bottom recovery flask and concentrated on a rotary evaporator under reduced pressure to give 115.2 g of a colorless and transparent liquid. Analysis of this reaction product by $^{29}$Si-nuclear magnetic resonance analysis showed it to be a branched siloxane-silalkylene copolymer with the average molecular formula given below that contained an average of 8.6 silicon-bonded hydrogen atoms in each molecule and an average of 3.4 silicon-bonded methoxy groups in each molecule. This branched siloxane-silalkylene copolymer was found to have a number-average molecular weight of 1,980 (polystyrene basis) by gel permeation chromatography and was described by formula

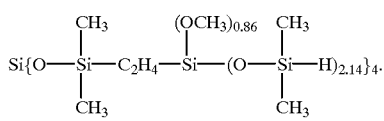

Example 2

Vinyltrimethoxysilane (51.8 g) and isopropanolic chloroplatinic acid solution (0.04 g 3%) were placed in a 200-mL four-neck flask equipped with a stirrer, thermometer, reflux condenser, and addition funnel and were heated at 100° C. while stirring. To this mixture 44.1 g of the branched siloxane-silalkylene copolymer prepared in Example 1 was gradually added dropwise from the addition funnel as the reaction temperature was kept at 100 to 110° C. After the completion of addition, the reaction solution was heated at 120° C. for an additional 1 hour. After cooling the reaction solution was transferred to a round bottom recovery flask and then concentrated on a rotary evaporator under reduced pressure to give 186.2 g of a very light brown liquid. Analysis of this reaction product by $^{29}$Si-nuclear magnetic resonance analysis confirmed it to be a branched siloxane-silalkylene copolymer containing an average of 29 silicon-bonded methoxy groups in each molecule. This branched siloxane-silalkylene copolymer was found to have a number-average molecular weight of 2,900 (polystyrene basis) by gel permeation chromatography. The average formula was

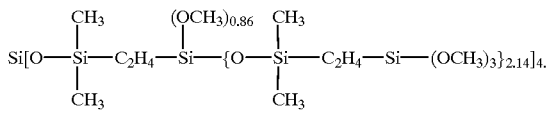

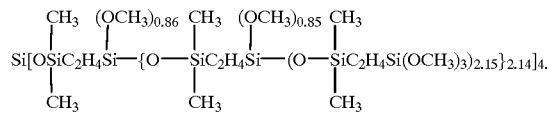

Example 3

1,1,3,3-tetramethyldisiloxane (134.3 g), 100 mL concentrated hydrochloric acid, 200 mL water, and 200 mL isopropanol were placed in a 1-L four-neck flask equipped with a stirrer, thermometer, reflux condenser, and addition funnel and were stirred. To this mixture 73.3 g of the branched siloxane-silalkylene copolymer prepared in Example 2 was gradually added dropwise from the addition funnel over 1 hour. After the completion of addition, the reaction solution was stirred at room temperature for an additional 1 hour. The reaction solution was then transferred to a separatory funnel and the lower layer was separated off. The remaining liquid upper layer was washed twice with 200 mL water and once with 50 mL saturated aqueous sodium bicarbonate and was thereafter dried over anhydrous magnesium sulfate. The produced solid was filtered off, and the resulting solution was transferred to a round bottom recovery flask and concentrated on a rotary evaporator under reduced pressure to give 102.2 g of a colorless and transparent liquid. Analysis of the reaction product by $^{29}$Si-nuclear magnetic resonance analysis confirmed it to be a branched siloxane-silalkylene copolymer containing an average of 17.9 silicon-bonded hydrogen atoms in each molecule and an average of 11.1 silicon-bonded methoxy groups in each molecule. This branched siloxane-silalkylene copolymer was found to have a number-average molecular weight of 4,350 (polystyrene basis) by gel permeation chromatography. The average formula was

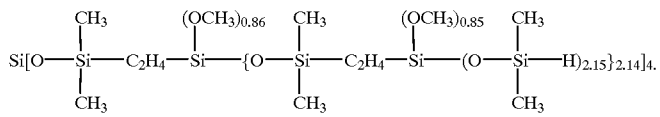

Example 4

Vinyltrimethoxysilane (51.8 g) and isopropanolic chloroplatinic acid solution (0.04 g 3%) were placed in a 200 mL four-neck flask equipped with a stirrer, thermometer, reflux condenser, and addition funnel and were then heated at 100° C. with stirring. To the resulting mixture 44.1 g of the branched siloxane-silalkylene copolymer prepared in Example 3 was gradually added dropwise from the addition funnel as the reaction temperature was kept at 100 to 110° C. After the completion of addition the reaction solution was heated at 120° C. for an additional 1 hour. After cooling the reaction solution was transferred to a round bottom recovery flask and then concentrated on a rotary evaporator under reduced pressure to give 186.2 g of a very light brown liquid. Analysis of this reaction product by $^{29}$Si-nuclear magnetic resonance analysis showed it to be a branched siloxane-silalkylene copolymer containing an average of 65 silicon-bonded methoxy groups in each molecule. The number-average molecular weight of this branched siloxane-silalkylene copolymer was determined to be 4,430 (polystyrene basis) by gel permeation chromatography. The average formula was

Example 5

Vinyltrimethoxysilane (97.8 g) and 0.04 g 3% isopropanolic chloroplatinic acid solution were placed in a 200-mL four-neck flask equipped with a stirrer, thermometer, reflux condenser, and addition funnel and were heated at 100° C. while stirring. To the resulting mixture 53.7 g of methyltris (dimethylsiloxy)silane was gradually added dropwise from the addition funnel in such a manner that the reaction temperature was kept at 100 to 110° C. After the completion of addition, the reaction solution was heated at 120° C. for an additional 1 hour. After cooling the reaction solution was transferred to a round bottom recovery flask and concentrated on a rotary evaporator under reduced pressure to give 142.5 g of a very light brown and transparent liquid. Next, 120.9 g 1,1,3,3-tetramethyldisiloxane, 100 mL concentrated hydrochloric acid, 200 mL water, and 200 mL isopropanol were placed in a 1-L four-neck flask equipped with a stirrer, thermometer, reflux condenser, and addition funnel and were stirred. To this mixture gradually added dropwise was 71.3 g of the very light brown and transparent liquid referenced above from the addition funnel over 1 hour. After the completion of addition the reaction solution was stirred for an additional 1 hour at room temperature. The reaction solution was then transferred to a separatory funnel, where the lower layer was separated off. The remaining liquid upper layer was washed twice with 200 mL water and once with 50 mL saturated aqueous sodium bicarbonate and was subsequently dried over anhydrous magnesium sulfate. The produced solid was filtered off and the resulting solution was transferred to a roundbottom recovery flask and concentrated on a rotary evaporator under reduced pressure to give 98.3 g of a colorless and transparent liquid. Analysis of this reaction product by $^{29}$Si-nuclear magnetic resonance analysis showed it to be a branched siloxane-silalkylene copolymer with the average molecular formula given below that contained an average of 6.5 silicon-bonded hydrogen atoms in each molecule and an average of 2.5 silicon-bonded methoxy groups in each molecule. This branched siloxane-silalkylene copolymer was found to have a number-average molecular weight of 1,446 (polystyrene basis) by gel permeation chromatography. The average formula was

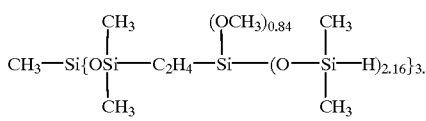

I claim:

1. A branched siloxane-silalkylene copolymer described by average formula

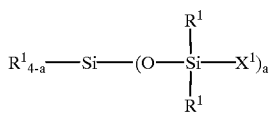

where $R^1$ is selected from the group consisting of $C_1$ to $C_{10}$ alkyl and aryl, a is 3 or 4, and $X^1$ is a silylalkyl group described by formula

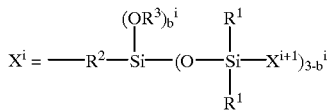

at i = 1, where $R^1$ is as previously defined, $R^2$ is selected from the group consisting of $C_2$ to $C_{10}$ alkylene, $R^3$ is selected from the group consisting of $C_1$ to $C_{10}$ alkyl, $X^{i+1}$ is a hydrogen atom or the silylalkyl group, i is an integer with a value from 1 to 10 that specifies the generation of the silylalkyl group, and $b^i$ is an integer from 0 to 3.

2. A branched siloxane-silalkylene copolymer according to claim 1, where the copolymer is described by average formula

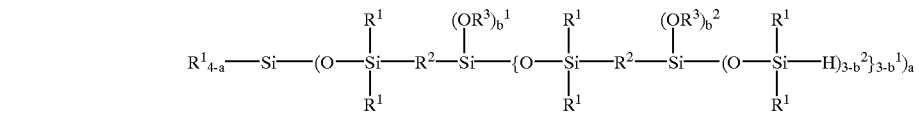

where $R^1$, $R^2$, and $R^3$ are as previously defined, $b^1$ is an integer from 0 to 3, and a is 3 or 4.

3. A branched siloxane-silalkylene copolymer according to claim 1, where the copolymer is described by average formula

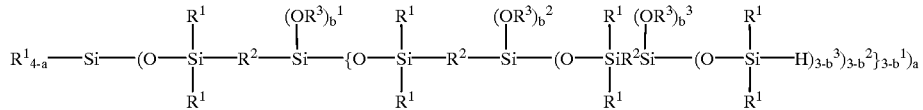

where $R^1$, $R^2$, $R^3$, a, and $b^1$ are as previously defined, $b^2$ is an integer from 0 to 3, and the sum of $b^1$ in the individual molecule is less than $(3 \times a)$.

4. A branched siloxane-silalkylene copolymer according to claim 1, where the copolymer is described by formula where $R^1$, $R^2$, $R^3$, a, $b^1$ and $b^2$ are as previously defined, $b^3$ is an integer from 0 to 3; the sum of $b^1$ in the individual molecule is less than $(3 \times a)$; and the sum of $b^2$ in the individual molecule is less than $\{3 \times a \times (3-b^1)\}$.

* * * * *